(12) United States Patent
Lee, IV et al.

(10) Patent No.: US 7,900,585 B2
(45) Date of Patent: Mar. 8, 2011

(54) TWO-PROBE BARK CONTROL DEVICE AND METHOD FOR MAKING SUCH

(75) Inventors: Albert L. Lee, IV, Seymour, TN (US); Steven M. Schrick, Knoxville, TN (US); David A. Hinkle, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 587 days.

(21) Appl. No.: 11/621,903

(22) Filed: Jan. 10, 2007

(65) Prior Publication Data
US 2008/0163829 A1 Jul. 10, 2008

(51) Int. Cl.
*A01K 15/02* (2006.01)
(52) U.S. Cl. .......... 119/719; 119/718; 119/859; 119/905
(58) Field of Classification Search .................. 119/712, 119/718–721, 858, 859, 862, 905, 908; 340/566, 340/573.1–573.3; *A01K 15/02*
See application file for complete search history.

(56) References Cited

U.S. PATENT DOCUMENTS

| 2,741,224 | A | 4/1956 | Puman |
| 4,947,795 | A | 8/1990 | Farkas |
| 5,159,580 | A | 10/1992 | Andersen et al. |
| 5,601,054 | A | 2/1997 | So |
| 6,907,844 | B1 * | 6/2005 | Crist et al. ............ 119/718 |
| 6,928,958 | B2 | 8/2005 | Crist et al. |
| 7,296,540 | B2 * | 11/2007 | Boyd .................. 119/720 |
| 2005/0145200 | A1 | 7/2005 | Napolez et al. |
| 2005/0235924 | A1 * | 10/2005 | Lee et al. ............. 119/718 |
| 2005/0263106 | A1 * | 12/2005 | Steinbacher .......... 119/858 |

* cited by examiner

*Primary Examiner* — Kimberly S Smith
*Assistant Examiner* — Marisa Conlon
(74) *Attorney, Agent, or Firm* — Pitts & Brittian, P.C.

(57) ABSTRACT

Described is a two-probe bark control device for detecting an animal's bark by way of an electrode that is also used in delivering an electrical stimulus to the animal. The two-probe bark control device includes a housing, a first probe, and a second probe. The first and second probes include first and second electrodes, respectively. The first electrode is secured to the housing by way of a resilient overmolding such that the first electrode extends outwardly from the housing and has the potential to vibrate within the housing. The housing is carried by the animal such that the first probe detects the bark of the animal and the first and second probes deliver an electrical stimulus to the animal in response the first probe detecting the animal's bark such that the first probe both detects the animal's bark and delivers an electrical stimulus to the animal.

11 Claims, 4 Drawing Sheets

TWO-PROBE BARK CONTROL DEVICE AND METHOD FOR MAKING SUCH

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a device for discouraging an animal from barking. More particularly, this invention pertains to a device for detecting the animal's bark by way of a vibration sensitive electrode and for delivering an electrical stimulus to the animal by way of the electrode when the animal barks.

2. Description of the Related Art

Many pet owners have a pet that barks undesirably and thus have a need for a device that effectively discourages the pet from barking. Conventional anti-bark devices typically include various probes that are positioned in contact with the pet's throat. More specifically, anti-bark devices typically include a bark detector probe, such as a piezoelectric transducer, and two electrode probes for delivering an electrical stimulus to the pet. However, many pet owners view the various probes of anti-bark devices as uncomfortable for the pet. Additionally, the multiplicity of probes pressed against the pet's throat produces a degree of actual discomfort for the pet. Consequently, limiting the number of probes included on an anti-bark device provides a degree of security and mental comfort for pet owners considering the implementation of the anti-bark device and reduces the actual discomfort experienced by the pet carrying the anti-bark device.

BRIEF SUMMARY OF THE INVENTION

In accordance with the various features of the present invention there is provided a two-probe bark control device for detecting an animal's bark by way of an electrode that is also used in delivering an electrical stimulus to the animal. The two-probe bark control device includes a housing, a first probe, a second probe, a piezoelectric transducer, a processing device, and a stimulus generator. The first probe includes a first electrode and a first resilient overmolding. The second probe includes a second electrode and a second resilient overmolding. The first electrode is in mechanical communication with the piezoelectric transducer, which is in electrical communication with the processing device. The processing device is in electrical communication with the stimulus generator, which is in electrical communication with the first electrode and the second electrode such that the stimulus generator delivers an electrical stimulus to the animal by way of the first electrode and the second electrode. The piezoelectric transducer, the processing device, and the stimulus generator are disposed within the housing. The first electrode and the second electrode are secured to the housing such that the first electrode and the second electrode extend outwardly therefrom. The first electrode is secured to the housing by way of the first resilient overmolding such that the first electrode has the potential to vibrate. The first electrode is mechanically engaged with the piezoelectric transducer such that when a vibration is applied to the first electrode, the first electrode vibrates correspondingly, transferring the vibration to the piezoelectric transducer, which generates an electrical signal representative of the vibration applied to the first electrode. The housing is carried by the animal such that the first electrode and the second electrode are in physical contact with the animal's throat. When the animal barks, the animal's vocal chords vibrate, causing the first electrode to vibrate. The vibration of the first electrode corresponds with the vibration of the animal's vocal chords. Consequently, the electrical signal generated by the piezoelectric transducer is representative of the vibration of the animal's vocal chords. The processing device receives the electrical signal and determines whether the electrical signal is a manifestation of the animal's bark. If the electrical signal is a result of the animal's bark, the processing device prompts the stimulus generator to deliver the electrical stimulus to the animal by way of the first electrode and the second electrode such that the first probe both detects the vibration of the animal's vocal chords and delivers an electrical stimulus to the animal.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
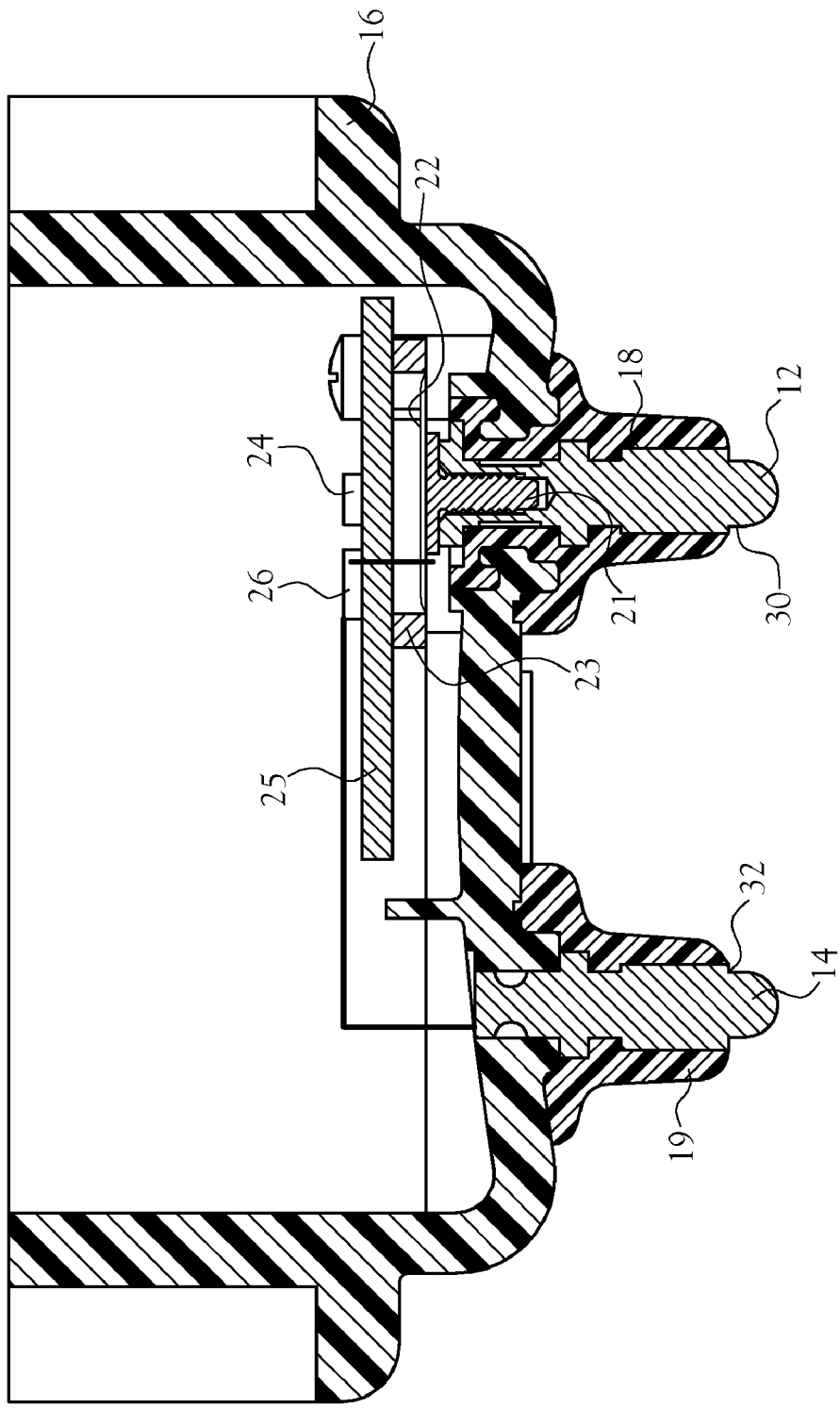
FIG. 1 is a sectional view of one embodiment of the two-probe bark control device in accordance with the various features of the present invention.

One embodiment of a two-probe bark control device for detecting an animal's bark by way of an electrode that is also used in delivering an electrical stimulus to the animal and constructed in accordance with the various features of the present invention is illustrated generally at 10 in FIG. 1. The two-probe bark control device 10 includes a housing, a first probe, a second probe, a piezoelectric transducer, a processing device, and a stimulus generator. The first probe includes a first electrode and a first resilient overmolding. The second probe includes a second electrode and a second resilient overmolding. The first electrode is in mechnical communication with the piezoelectric transducer, which is in electrical communication with the processing device. The processing device is in electrical communication with the stimulus generator, which is in electrical communication with the first electrode and the second electrode such that the stimulus generator delivers an electrical stimulus to the animal by way of the first electrode and the second electrode. The piezoelectric transducer, the processing device, and the stimulus generator are disposed within the housing. The first electrode and the second electrode are secured to the housing such that the first electrode and the second electrode extend outwardly therefrom. The first electrode is secured to the housing by way of the first resilient overmolding such that the first electrode has the potential to vibrate. The first electrode is mechanically engaged with the piezoelectric transducer such that when a vibration is applied to the first electrode, the first electrode vibrates correspondingly, transferring the vibration to the piezoelectric transducer, which generates an electrical signal representative of the vibration applied to the first electrode. The housing is carried by the animal such that the first electrode and the second electrode are in physical contact with the animal's throat. When the animal barks, the animal's vocal chords vibrate, causing the first electrode to vibrate. The vibration of the first electrode corresponds with the vibration of the animal's vocal chords. Consequently, the electrical signal generated by the piezoelectric transducer is representative of the vibration of the animal's vocal chords. The processing device receives the electrical signal and determines whether the electrical signal is a manifestation of the animal's bark. If the electrical signal is a result of the animal's bark, the processing device prompts the stimulus generator to deliver the electrical stimulus to the animal by way of the first electrode and the second electrode such that the first probe both detects the vibration of the animal's vocal chords and delivers an electrical stimulus to the animal.

Figure 2:
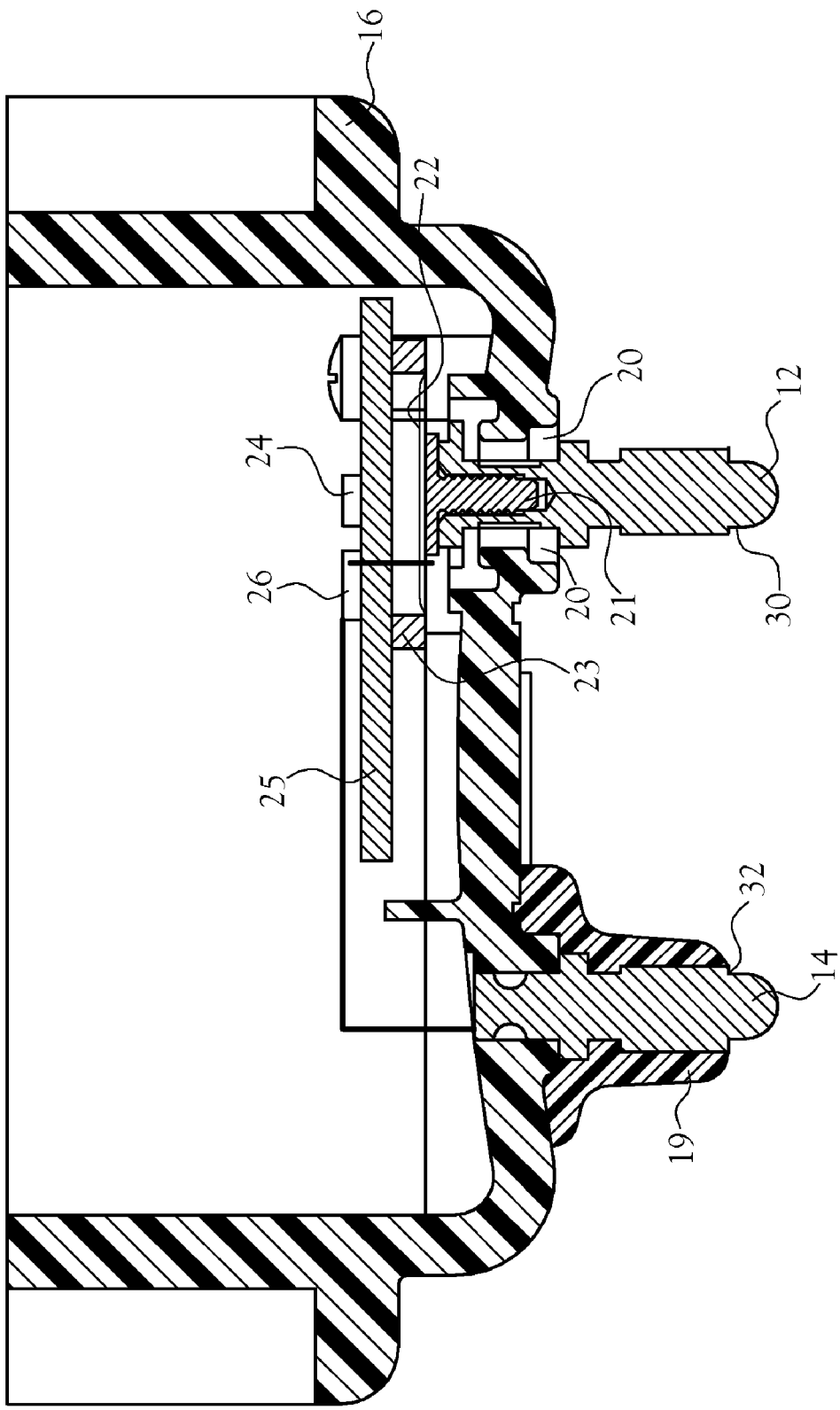
FIG. 2 illustrates the two-probe bark control device of FIG. 1 depicting the cavity defined by the first electrode and the housing of the two-probe bark control device.

FIG. 1 illustrates a sectional view of one embodiment of the two-probe bark control device 10 in accordance with the various features of the present invention. The two-probe bark control device 10 includes a first probe 30, a second probe 32, and a housing 16. The first probe 30 includes a first electrode 12 and a first resilient overmolding 18. The second probe 32 includes a second electrode 14 and a second resilient overmolding 19. The first electrode 12 and the second electrode 14 are secured to the housing 16 such that the first electrode 12 and the second electrode 14 extend outwardly from the housing 16 through respective through openings in the housing 16. The first electrode 12 is secured to the housing 16 by way of the first overmolding 18. More specifically, the first electrode 12 is operably positioned within the housing 16. When operably positioned, the first electrode 12 and the housing 16 define a cavity 20 at the through opening through which the first electrode 12 extends outwardly from the housing 16, as illustrated at FIG. 2. The first overmolding 18 is injected into the cavity 20 to the extent that the first overmolding 18 occupies the cavity 20, as depicted in FIG. 1. The first overmolding 18 molecularly adheres to the first electrode 12 and the housing 16 such that the first overmolding 18 secures the first electrode 12 within the housing 16. Additionally, the first overmolding 18 firms within the cavity 20, physically locking the first overmolding 18, and thus the first electrode 12, within the housing 16. The first overmolding 18 is a resilient material to the extent that after the first overmolding 18 firms within the cavity 20, the first overmolding 18 allows the first electrode 12 to move, i.e. vibrate, within the housing 16. In the illustrated embodiment, the first overmolding 18 is non-conductive and surrounds the portion of the first electrode 12 that extends outwardly from the housing 16, providing the first electrode 12 with structural support and electrical insulation. The first overmolding 18 does not cover the tip of the first electrode 12 so that the electrically conductive tip of the first electrode 12 is exposed and adapted to deliver an electrical stimulus to the animal. The structural support provided by the first overmolding 18 reduces the sensitivity of the first electrode's 12 potential for vibration, reducing vibrations resulting from forces not relating the animal's bark. In one embodiment, the first overmolding 18 is a rubber-based material. However, it should be noted that the first overmolding 18 can be a material other than a rubber-based material without departing from the scope or spirit of the present invention. It should also be noted that the first overmolding 18 need not be non-conductive or surround the portion of the first electrode 12 that extends outwardly from the housing 16 to remain within the scope or spirit of the present invention.

In the illustrated embodiment, the two-probe bark control device 10 includes a conductive insert 21 that is adjustably secured to the first electrode 12 and extends therefrom. More specifically, in the illustrated embodiment, the conductive insert 21 includes a male threaded portion that is compatible with a female threaded portion of the first electrode 12. It should be noted that the conductive insert 21 can be adjustably secured to the first electrode 12 by ways other than compatible threaded portions, such as compatible slip fit portions or frictional fit portions, without departing from the scope or spirit of the present invention. The conductive insert 21 also includes a base portion that extends from the first electrode 12. In the illustrated embodiment, the distance between the base portion of the conductive insert 21 and the first electrode 12 is adjusted by twisting the base portion such that the conductive insert 21 moves along the track provided by the compatible threaded portions of the conductive insert 21 and the first electrode 12 respectively. The base portion of the conductive insert 21 is operably engaged with a transducer 22 such that when the first electrode 12 vibrates as provided by the first resilient overmolding 18, the transducer 22 generates an electrical signal that corresponds to the vibration of the first electrode 12. In other words, the electrical signal generated by the transducer 22 is representative of the vibration of the first electrode 12. In the illustrated embodiment, the transducer 22 is a piezoelectric transducer that generates the electrical signal in response to being mechanically stressed by the base portion of the conductive insert 21. The conductive insert 21 is adjusted, i.e., rotated, to the extent that the base portion of the conductive insert 21 is in mechanical contact with the transducer 22 such that when the first electrode 12 vibrates as provided by the first overmolding 18, the base portion of the conductive insert 21 mechanically stresses the transducer 22. It should be noted that the transducer 22 can be a device that converts mechanical energy to electrical energy other than a piezoelectric transducer, such as an accelerometer or a velocimeter, without departing from the scope or spirit of the present invention. It should also be noted that the first electrode 12 can be operably engaged directly with the transducer 22 such that implementation of the conductive insert 21 is not necessary to remain within the scope or spirit of the present invention.

In the illustrated embodiment, the two-probe bark control device 10 includes a preloading mechanism 23 for preloading the transducer 22. Preloading a piezoelectric transducer includes partially compressing the transducer such that the crystals of the piezoelectric transducer are mechanically stressed to the extent that they generate a small amount of current. The small amount of current is not sufficient to cause a device in electrical communication with the piezoelectric transducer to respond as it would to the electrical signal generated by the transducer 22. However, a preloaded piezoelectric transducer is more responsive in both time and sensitivity to being mechanically stressed by, for example, in the illustrated embodiment, the base portion of the conductive insert 21. Consequently, the preloading mechanism 23 compresses the edges of the transducer 22 to increase the response time and sensitivity of the transducer 22. In the illustrated embodiment, the preloading mechanism preloads, i.e., partially compresses, the transducer 22 from the top, that is from the side opposite the first electrode 12 with respect to the transducer 22. It should be noted that the preloading mechanism can preload the transducer 22 from the bottom without departing from the scope or spirit of the present invention.

Additionally, it should be noted that the transducer 22 need not be preloaded to remain within the scope or spirit of the present invention.

Figure 3:
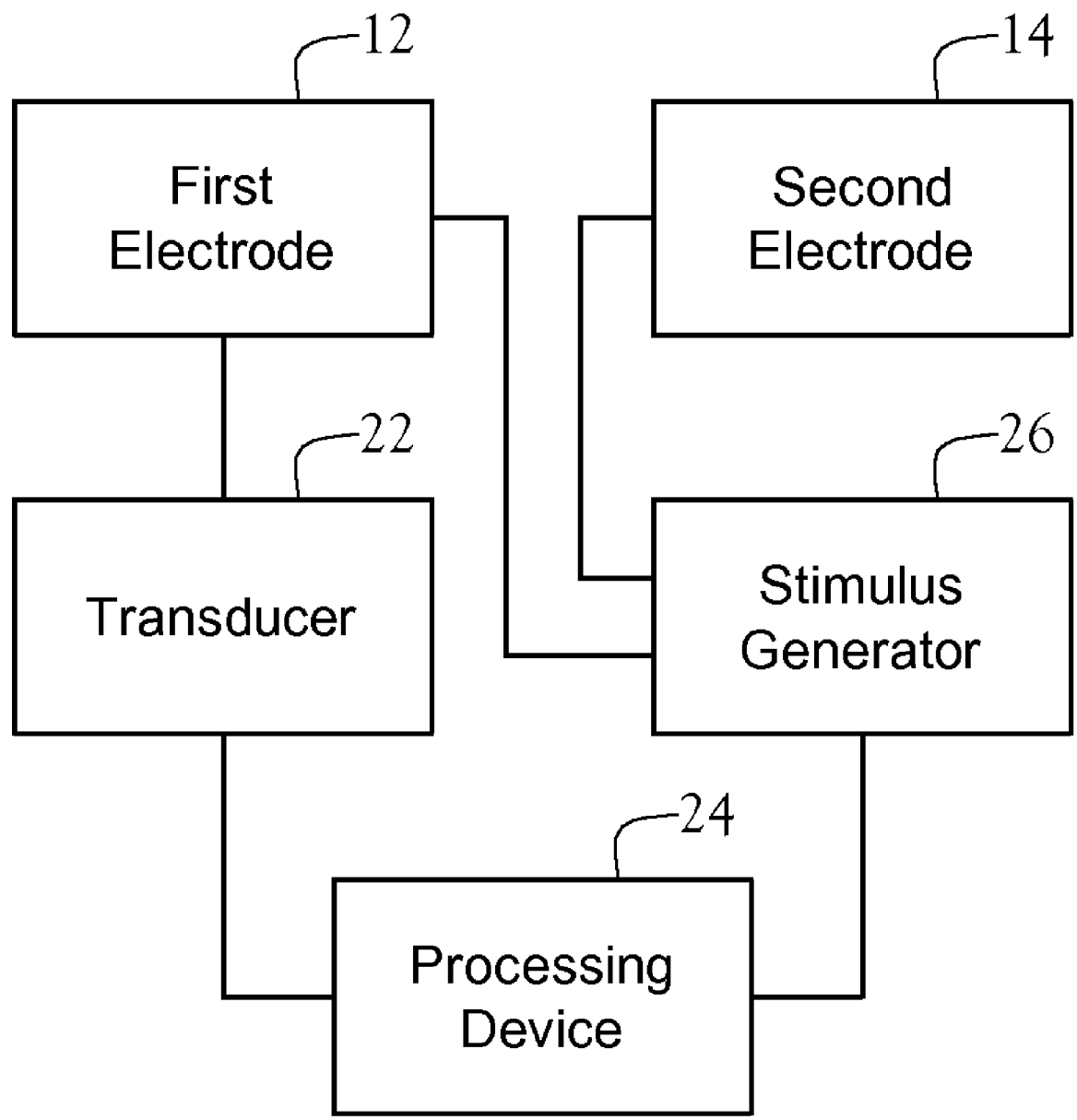
FIG. 3 is a block diagram illustrating electrical components of the two-probe bark control device.

FIG. 3 is a block diagram illustrating various electrical components of the two-probe bark control device 10. As discussed, the first electrode 12 is in mechanical communication with the transducer 22. The transducer 22 is in electrical communication with a processing device 24 that, in the illustrated embodiments of FIG. 1 and FIG. 2, is integrated into a printed circuit board (PCB) 25. The processing device 24 receives the electrical signal generated by the transducer 22. The processing device 24 processes the electrical signal, considering factors such as the electrical signal's amplitude and frequency, to determine whether the electrical signal is a manifestation of a bark from the animal. In other words, the processing device 24 determines whether the animal barked. Those skilled in the art will recognize that the processing device can be any device capable of processing the electrical signal, such as a microprocessor, a custom designed ASIC or CPLD, or discrete analog or digital electronics, without departing from the scope or spirit of the present invention. Additionally, those skilled in the art will recognize that the processing device 24 need not be integrated into a PCB to remain within the scope or spirit of the present invention. The processing device 24 is in electrical communication with a stimulus generator 26 that, in the illustrated embodiments of FIG. 1 and FIG. 2, is integrated into the PCB 25. The stimulus generator 26 is also in electrical communication with the first electrode 12 and the second electrode 14. The stimulus generator 26 is for generating an electrical stimulus and delivering the electrical stimulus to the animal by way of the first electrode 12 and the second electrode 14. When the processing device 24 determines that the electrical signal is a manifestation of a bark from the animal, the processing device 24 activates the stimulus generator 26, causing the stimulus generator 26 to deliver an electrical stimulus to the animal. Those skilled in the art will recognize that the stimulus generator 26 need not be integrated into a PCB to remain within the scope or spirit of the present invention.

The second electrode 14 of the second probe 32 is in electrical communication with the stimulus generator 26 as previously discussed. In the illustrated embodiment, the second overmolding 19 is non-conductive and surrounds the portion of the second electrode 14 that extends outwardly from the housing 16, providing the second electrode 14 with electrical insulation. The second overmolding 19 does not cover the tip of the second electrode 14 so that the electrically conductive tip of the second electrode 14 is exposed and adapted to deliver an electrical stimulus to the animal. In one embodiment, the second overmolding 19 is a rubber-based material. However, it should be noted that the second overmolding 19 can be a material other than a rubber-based material without departing from the scope or spirit of the present invention. It should also be noted that the second overmolding 19 need not be non-conductive or surround the portion of the second electrode 14 that extends outwardly from the housing 16 to remain within the scope or spirit of the present invention. Additionally, it should be noted that the implementation of the second overmolding 19 is not necessary to remain within the scope or spirit of the present invention.

Figure 4:
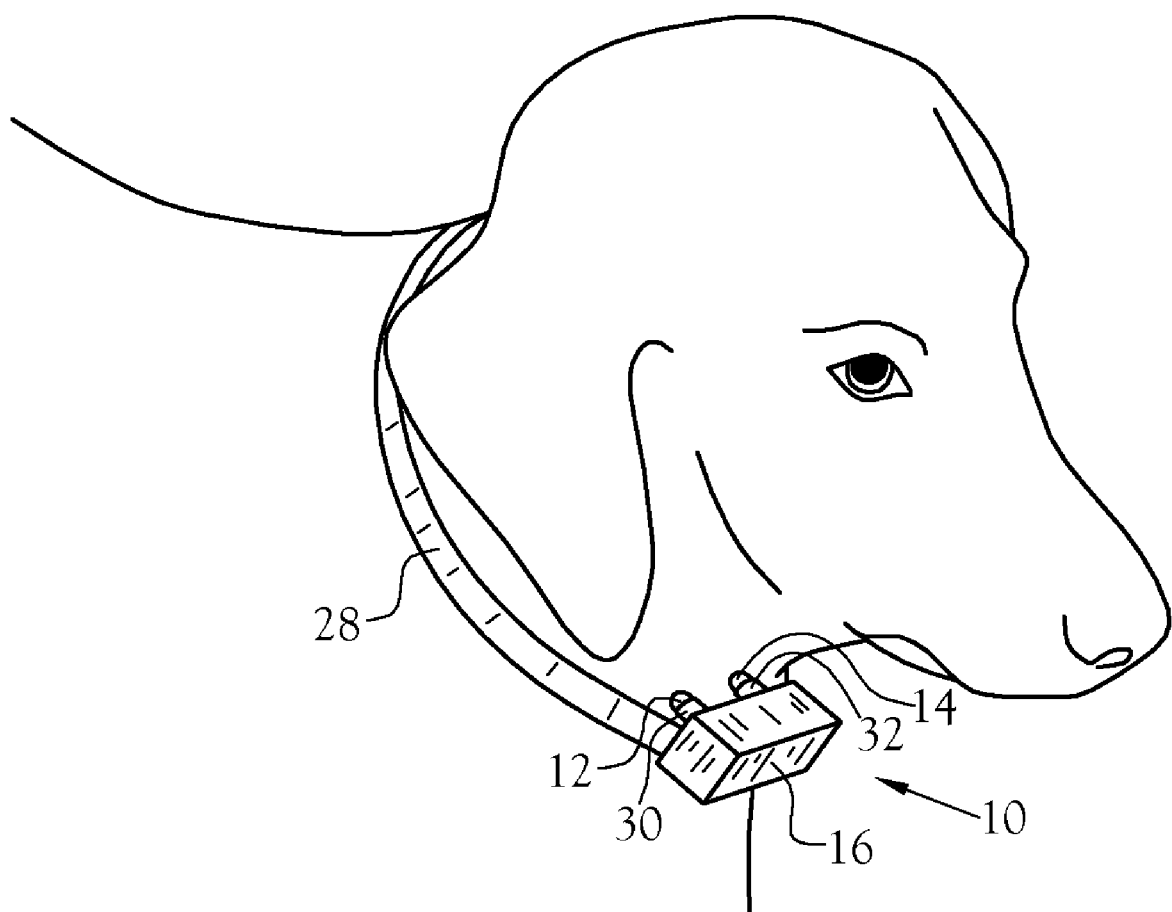
FIG. 4 illustrates the two-probe bark control device of FIG. 1 secured to an animal in accordance with the various features of the present invention.

FIG. 4 illustrates one embodiment of the two-probe bark control device 10 secured to the animal in accordance with the various features of the present invention. The two-probe bark control device 10 is carried by the animal such that the first electrode 12 of the first probe 30 and the second electrode 14 of the second probe 32 are in contact with the animal's throat. In the illustrated embodiment, the two-probe bark control device 10 is carried by the animal by way of a collar 28. Because the first electrode 12 is in contact with the animal's throat, when the animal barks, the vibration generated by the animal's vocal chords causes the first electrode 12 to vibrate as provided for by the resilient overmolding 18. The vibration of the first electrode 12 corresponds to the vibration of the animal's vocal chords. The vibrating first electrode 12 mechanically stresses the piezoelectric transducer 22 by way of the base portion of the conductive insert 21, inducing the transducer 22 to generate the electrical signal representative of the vibration of the first electrode 12, which is representative of the vibration of the animal's vocal chords. The electrical signal generated by the transducer 22 is processed by the processing device 24, and because the vibration is the result of the animal's bark, the processing device 24 activates the stimulus generator 26 to generate the electrical stimulus. Because the first electrode 12 and the second electrode 14 are in contact with the animal, the stimulus generator 26 delivers the electrical stimulus to the animal by way of the first electrode 12 and the second electrode 14. Because the electrical stimulus is delivered to the animal when the animal barks, the animal is discouraged from barking.

From the foregoing description, those skilled in the art will recognize that a device for discouraging an animal from barking offering advantages over the prior art has been provided. The device provides a two-probe design that detects the animal's bark and delivers an electrical stimulus to the animal when it barks. Further, the device provides at least one probe that is secured to the housing by way of a resilient overmolding such that the at least one probe detects vibrations generated by the vocal chords of a barking animal and delivers an electrical stimulus to the animal.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. A two-probe bark control device for discouraging an animal from barking, said two-probe bark control device comprising:
   a housing adapted to be carried by the animal;
   a first probe including a first electrode and a resilient overmolding, the first electrode being secured to said housing by way of the resilient overmolding wherein the resilient overmolding surrounds the electrode inwardly of the housing and extends outwardly from the housing except for the tip of the first electrode, the resilient overmolding allowing the first electrode to vibrate, the first electrode adapted to be situated in physical contact with the throat of the animal;
   a second probe including a second electrode secured to said housing such that the second electrode extends outwardly from said housing, the second electrode adapted to be situated in physical contact with the animal;
   a transducer disposed within said housing, said transducer being in operable engagement with the first electrode, said transducer converting a vibration of the first electrode to an electrical signal that is representative of the vibration of the first electrode;

a processing device disposed within said housing, said processing device in electrical communication with said transducer, said processing device determining whether the electrical signal generated by said transducer is the manifestation of a bark from the animal; and a stimulus generator disposed within said housing, said stimulus generator in electrical communication with said processing device, the first electrode, and the second electrode, said stimulus generator generating an electrical stimulus when said processing device determines that the electrical signal generated by said transducer is the manifestation of a bark from the animal, said stimulus generator delivering the electrical stimulus to the animal by way of the first electrode and the second electrode.

2. The two-probe bark control device of claim 1 wherein the resilient overmolding is non-conductive.

3. The two-probe bark control device of claim 2 wherein the resilient overmolding surrounds the portion of the second electrode that extends outwardly from said housing except for the tip of the second electrode.

4. The two-probe bark control device of claim 1 wherein the resilient overmolding is a rubber-based material.

5. The two-probe bark control device of claim 1 wherein said transducer is a piezoelectric transducer.

6. A two-probe bark control device for discouraging an animal from making a sound, said two-probe bark control device comprising:

a housing adapted to be carried by the animal;

a first electrode secured to and extending outwardly from said housing, said first electrode secured to said housing by way of a resilient overmolding, wherein the resilient overmolding surrounds the electrode inwardly of the housing and extends outwardly from said housing except for the tip of the first electrode, the resilient overmolding providing said first electrode with a potential for vibration;

a transducer in operable communication with said first electrode, said transducer generating an electrical signal representative of said first electrode's vibration;

a second electrode secured to and extending outwardly from said housing; and a stimulus generator in electrical communication with said transducer, said first electrode, and said second electrode, said stimulus generator delivering an electrical stimulus to the animal by way of said first electrode and said second electrode when said transducer generates the electrical signal.

7. The two-probe bark control device of claim 6 wherein said first electrode and said second electrode are situated in physical contact with the animal's throat.

8. The two-probe bark control device of claim 6 further comprising a processing device, said processing device in electrical communication with said transducer and said stimulus generator such that said stimulus generator is in electrical communication with said transducer by way of said processing device, said processing device determining whether the electrical signal generated by said transducer is a manifestation of the animal's bark, said processing device prompting said stimulus generator to deliver a stimulus to the animal when the electrical signal generated by said transducer is a manifestation of the animal's bark.

9. The two-probe bark control device of claim 8 wherein said processing device determines whether the electrical signal generated by said transducer is a manifestation of the animal's bark by considering factors including the electrical signal's amplitude and frequency.

10. The two-probe bark control device of claim 8 wherein said processing device is disposed within said housing.

11. The two-probe bark control device of claim 6 wherein said transducer and said stimulus generator are disposed within said housing.

* * * * *